United States Patent
Ito et al.

(10) Patent No.: US 11,300,219 B2
(45) Date of Patent: Apr. 12, 2022

(54) VARIABLE-CAPACITY COMPRESSOR CONTROL VALVE

(71) Applicants: MAHLE International GmbH, Stuttgart (DE); Fujikoki Corporation, Tokyo (JP)

(72) Inventors: Masaharu Ito, Tokyo (JP); Yoshiyuki Kume, Tokyo (JP); Matthew R. Warren, Buffalo, NY (US); Ernesto Jose Gutierrez, Amherst, NY (US)

(73) Assignees: MAHLE International GmbH, Stuttgart (DE); Fujikoki Corporation, Tokyo (JP)

( * ) Notice: Subject to any disclaimer, the term of this patent is extended or adjusted under 35 U.S.C. 154(b) by 105 days.

(21) Appl. No.: 16/940,644

(22) Filed: Jul. 28, 2020

(65) Prior Publication Data
US 2022/0034414 A1    Feb. 3, 2022

(51) Int. Cl.
*F16K 11/24* (2006.01)
*F04B 49/22* (2006.01)

(52) U.S. Cl.
CPC ............ *F16K 11/24* (2013.01); *F04B 49/22* (2013.01)

(58) Field of Classification Search
CPC .............................. F16K 11/24; F04B 49/22
USPC ...................................................... 417/222.2
See application file for complete search history.

(56) References Cited

U.S. PATENT DOCUMENTS

| | | | | |
|---|---|---|---|---|
| 8,079,827 | B2* | 12/2011 | Iwa | F04B 27/1804 417/222.2 |
| 2006/0228227 | A1* | 10/2006 | Mori | F04B 27/1804 417/222.2 |
| 2008/0138213 | A1* | 6/2008 | Umemura | F04B 27/1804 417/222.2 |
| 2012/0056113 | A1* | 3/2012 | Tano | F04B 27/1804 251/25 |
| 2014/0248163 | A1* | 9/2014 | Lee | F04B 27/18 417/222.2 |
| 2017/0184082 | A1* | 6/2017 | Domke | F04B 27/18 |
| 2019/0078562 | A1* | 3/2019 | Hayama | F16K 11/0716 |
| 2019/0154168 | A1* | 5/2019 | Kume | F04B 27/1804 |
| 2020/0355175 | A1* | 11/2020 | Hayama | F16K 31/0624 |
| 2021/0048009 | A1* | 2/2021 | Tano | F04B 27/1804 |
| 2021/0048010 | A1* | 2/2021 | Asano | F04B 27/1804 |
| 2021/0048018 | A1* | 2/2021 | Kurihara | F16K 31/06 |
| 2021/0340976 | A1* | 11/2021 | Itoh | F04B 39/10 |

FOREIGN PATENT DOCUMENTS

| JP | 5167121 B2 | 8/2009 |
|---|---|---|
| WO | 2018/043186 A1 | 3/2018 |

* cited by examiner

*Primary Examiner* — Daphne M Barry
*Assistant Examiner* — Patrick C Williams
(74) *Attorney, Agent, or Firm* — Dickinson Wright PLLC

(57) ABSTRACT

A variable-capacity compressor control valve is configured for easily regulating the opening degree of an in-valve release passage, and thus can effectively reduce internal circulation of refrigerant within the compressor and effectively improve the operation efficiency of the compressor. An in-valve large-opening release passage with a relatively large opening degree, which is used during the compressor actuation time, and an in-valve small-opening release passage with a relatively small opening degree, which is used during both the compressor actuation time and the normal control time (i.e., Pd→Pc control time), are formed using different passages.

7 Claims, 9 Drawing Sheets

NORMAL CONTROL TIME (POWER-ON TIME)
[MAIN VALVE ELEMENT (Pd-Pc): OPEN,
SUB VALVE ELEMENT (Pc-Ps): CLOSED,
AUXILIARY SUB VALVE ELEMENT (Pc-Ps): OPEN]

FIG. 6

[NORMAL CONTROL TIME]

[COMPRESSOR ACTUATION TIME]

VARIABLE-CAPACITY COMPRESSOR CONTROL VALVE

TECHNICAL FIELD

The present disclosure relates to a variable-capacity compressor control valve for use in an automotive air conditioner or the like. In particular, the present disclosure relates to a variable-capacity compressor control valve that can reduce internal circulation of refrigerant within the compressor and improve the operation efficiency of the compressor.

BACKGROUND

Conventionally, a variable-capacity swash plate compressor such as the one schematically illustrated in FIGS. 8A and 8B has been used as a compressor for an automotive air conditioner. The variable-capacity swash plate compressor 100 includes a rotating shaft 101 that is rotationally driven by an on-vehicle engine, a swash plate 102 attached to the rotating shaft 101, a crank chamber 104 in which the swash plate 102 is disposed, a piston 105 that is reciprocated by the swash plate 102, a discharge chamber 106 for discharging refrigerant compressed by the piston 105, a suction chamber 107 for sucking refrigerant, an in-compressor release passage (i.e., a fixed orifice) 108 for releasing the pressure Pc in the crank chamber 104 to the suction chamber 107, and the like.

Meanwhile, a control valve 1' used for the aforementioned variable-capacity compressor receives the discharge pressure Pd from the discharge chamber 106 of the compressor 100 and is configured to control the pressure Pc in the crank chamber 104 by controlling the discharge pressure Pd in accordance with the suction pressure Ps of the compressor 100. Such a control valve 1' has, as the basic configuration, a valve body that includes a valve chamber with a valve orifice, a Ps inlet/outlet port communicating with the suction chamber 107 of the compressor 100, a Pd introduction port arranged upstream of the valve orifice and communicating with the discharge chamber 106 of the compressor 100, and a Pc inlet/outlet port arranged downstream of the valve orifice and communicating with the crank chamber 104 of the compressor 100; a main valve element for opening or closing the valve orifice; an electromagnetic actuator with a plunger for moving the main valve element in the direction to open or close the valve orifice; a pressure-sensitive chamber that receives the suction pressure Ps from the compressor 100 via the Ps inlet/outlet port; and a pressure-sensitive reaction member that urges the main valve element in the direction to open or close the valve orifice in accordance with the pressure in the pressure-sensitive chamber. Further, an in-valve release passage 16' for releasing the pressure Pc in the crank chamber 104 to the suction chamber 107 of the compressor 100 via the Ps inlet/outlet port is provided in the main valve element, and a sub valve element for opening or closing the in-valve release passage 16' is also provided so that when the plunger is continuously moved upward from the lowest position by the attraction force of the electromagnetic actuator, the sub valve element moves upward together with the plunger while closing the in-valve release passage 16', and the main valve element is also moved upward so as to follow the sub valve element. Then, after the valve orifice is closed by the main valve element, if the plunger is moved further upward, the sub valve element is configured to open the in-valve release passage 16'. The main valve element and the valve orifice form a main valve unit indicated by reference numeral 11' in FIGS. 8A and 8B, while the sub valve element and the in-valve release passage form a sub valve unit indicated by reference numeral 12' (for example, see JP 2013-130126 A).

During the normal control time (i.e., Pd→Pc control time) of the control valve 1' with such a configuration, when current flows through a solenoid portion including a coil, a stator, an attractor, and the like of the electromagnetic actuator, the plunger is attracted by the attractor, and along with this, the sub valve element moves upward integrally with the plunger, and following the movement of the sub valve element, the main valve element is also moved in the direction to close the valve by the urging force of a valve-closing spring. Meanwhile, the suction pressure Ps introduced from the compressor 100 via the Ps inlet/outlet port is introduced into the pressure-sensitive chamber through an inlet/outlet chamber via a horizontal hole in the plunger or the like, and the pressure-sensitive reaction member (e.g., a bellows device) is expansively or contractively displaced in accordance with the pressure (i.e., the suction pressure Ps) in the pressure-sensitive chamber (i.e., contracts if the suction pressure Ps is high, and expands if it is low), and the displacement (i.e., urging force) is then transmitted to the main valve element, whereby the main valve element portion of the main valve element moves up or down with respect to the valve orifice to regulate the valve opening degree of the main valve unit 11'. That is, the valve opening degree is determined by the force of attracting the plunger with the solenoid portion, urging force (i.e., expansion or contraction force) that acts with the expansive or contractive displacement of the pressure-sensitive reaction member, the urging force of a plunger spring (i.e., a valve-opening spring) and the valve-closing spring, and force that acts on the main valve element in the direction to open the valve and the direction to close the valve. The pressure Pc in the crank chamber 104 (hereinafter also referred to as "crank chamber pressure Pc" or simply referred to as "pressure Pc") is controlled in accordance with the valve opening degree. In such a case, the main valve element is always urged upward by the urging force of the valve-closing spring, while the sub valve element is always urged downward by the urging force of the valve-opening spring. Thus, the sub valve unit 12' is closed and the in-valve release passage 16' is blocked within the main valve element. Therefore, there is no possibility that the crank chamber pressure Pc may be released to the suction chamber 107 via the in-valve release passage 16'.

In contrast, during the compressor actuation time, current flows through the solenoid portion so that the plunger is attracted by the attractor and the sub valve element moves upward together with the plunger. Following the upward movement of the sub valve element, the main valve element is moved in the direction to close the valve by the urging force of the valve-closing spring, and after the valve orifice is closed by the main valve element portion of the main valve element, the plunger is moved further upward, whereby the sub valve element opens the in-valve release passage 16'.

As described above, in the aforementioned conventional control valve 1', since the crank chamber pressure Pc is released to the suction chamber 107 via two passages that are the in-compressor release passage 108 and the in-valve release passage 16' during the compressor actuation time, the time required to increase the discharge capacity can be shortened. Further, since the in-valve release passage 16' is closed by the sub valve element during the normal control time (i.e., Pd→Pc control time), there is no possibility that the operation efficiency of the compressor 100 would decrease.

In the aforementioned variable-capacity compressor control valve 1', the in-valve release passage 16' is closed by the sub valve element during the normal control time (i.e., Pd→Pc control time). However, there has already been developed a control valve with a configuration in which a crank chamber pressure Pc is slightly released to a suction chamber via an in-compressor release passage (i.e., a fixed orifice) as well as an in-valve release passage (i.e., an auxiliary communication passage) during the normal control time (i.e., Pd→Pc control time) (see, for example, JP 5167121 B and WO 2018/043186 A). In the control valve with such a configuration, the passage area (i.e., the opening area) of the in-compressor release passage (i.e., the fixed orifice) can be made small depending on the configuration of the system and the like, and thus, internal circulation of refrigerant within the compressor can be reduced. Therefore, the operation efficiency of the compressor may be improved.

By the way, in the control valve with the aforementioned configuration in which a crank chamber pressure Pc is released to a suction chamber via an in-valve release passage in an auxiliary manner during the normal control time (i.e., Pd→Pc control time), the passage area of the in-valve release passage (i.e., the area of the Pc-Ps flow channel) is desirably large during the compressor actuation time or when the volume of refrigerant flowing through the valve is large, while the passage area of the in-valve release passage (i.e., the area of the Pc-Ps flow channel) is desirably small during the power-off time or when the volume of refrigerant flowing through the valve is small.

However, the conventional control valves described in JP 5167121 B and WO 2018/043186 A, for example, have the following problems.

That is, in the control valve described in JP 5167121 B, a given amount of refrigerant defined by the passage area of the in-valve release passage flows into the suction chamber throughout the normal control time (i.e., Pd→Pc control time), which can decrease the operation efficiency of the compressor during the normal control time (i.e., Pd→Pc control time).

Meanwhile, in the control valve described in WO 2018/043186 A, the minimum area of the passage area of the in-valve release passage (i.e., the area of the Pc-Ps flow channel) during the normal control time (i.e., Pd→Pc control time) can be made small by configuring the passage area of the in-valve release passage of the control valve described in JP 5167121 B such that it is variable. However, since the in-valve release passage used during the compressor actuation time and the in-valve release passage used during the normal control time (i.e., Pd→Pc control time) are basically formed using a common (single) passage, design flexibility of the passage area of the in-valve release passage (i.e., the area of the Pc-Ps flow channel) is low, and thus, the aforementioned regulation of the opening degree of the in-valve release passage is difficult to perform.

SUMMARY

The present disclosure has been made in view of the foregoing, and exemplary embodiments relate to providing a variable-capacity compressor control valve that can easily regulate the opening degree (i.e. area) of an in-valve release passage, and thus can effectively reduce internal circulation of refrigerant within the compressor and effectively improve the operation efficiency of the compressor.

Accordingly, a variable-capacity compressor control valve in accordance with an embodiment of the present disclosure basically includes a valve body including a valve chamber with a valve orifice, a Ps inlet/outlet port communicating with a suction chamber of a compressor, a Pd introduction port arranged upstream of the valve orifice and communicating with a discharge chamber of the compressor, and a Pc inlet/outlet port arranged downstream of the valve orifice and communicating with a crank chamber of the compressor, a main valve element adapted to open or close the valve orifice, an electromagnetic actuator including a plunger, the plunger being adapted to move the main valve element in the direction to open or close the valve orifice, a pressure-sensitive chamber adapted to receive a suction pressure Ps from the compressor via the Ps inlet/outlet port, a pressure-sensitive reaction member adapted to urge the main valve element in the direction to open or close the valve orifice in accordance with a pressure in the pressure-sensitive chamber, an in-valve large-opening release passage adapted to release a pressure Pc in the crank chamber to the suction chamber of the compressor via the Ps inlet/outlet port, a sub valve element adapted to open or close the in-valve large-opening release passage along with a movement of the plunger, and an in-valve small-opening release passage having a smaller opening degree than that of the in-valve large-opening release passage, the in-valve small-opening release passage being adapted to release the pressure Pc in the crank chamber to the suction chamber of the compressor via the Ps inlet/outlet port, in which the in-valve small-opening release passage is adapted to be opened or closed as the main valve element is moved along with a movement of the plunger, and is adapted to be opened before the in-valve large-opening release passage is opened by the sub valve element.

In some embodiments, the opening degree of the in-valve small-opening release passage is variable in accordance with an amount of movement of the main valve element along with a movement of the plunger. In some other embodiments, the in-valve small-opening release passage gradually decreases as the main valve opening gradually increases. This reduces internal circulation of refrigerant because the main valve opening is smaller than if the small opening passaged was fixed area.

In some embodiments, the main valve element is adapted to be slidably fitted and inserted in the valve body, the in-valve large-opening release passage includes a release through-hole, the release through-hole vertically penetrating through the main valve element, and the in-valve small-opening release passage includes a part of the release through-hole and a communication hole, the communication hole extending from the release through-hole to a sliding surface of the main valve element that is adapted to slide on the valve body.

In some embodiments, the in-valve small-opening release passage includes an inner peripheral groove provided on an upper side of a sliding surface of the valve body on which the main valve element is adapted to slide.

In some embodiments, the in-valve small-opening release passage is adapted to be opened before the valve orifice is closed by the main valve element.

In some embodiments, when the plunger is continuously moved upward from the lowest position by an attraction force of the electromagnetic actuator, the main valve element is moved upward together with the plunger with the sub valve element closing the in-valve large-opening release passage, thereby opening the in-valve small-opening release passage, and the opening degree of the in-valve small-opening release passage is gradually increased as the main valve element is moved upward along with the movement of the plunger, which gradually decreases the main valve opening, and after that, when the valve orifice is closed by the main valve element and the plunger is further moved upward, the sub valve element is moved upward together with the plunger with the main valve element closing the valve orifice, thereby opening the in-valve large-opening release passage.

According to the present disclosure, the in-valve large-opening release passage with a relatively large opening degree, which is used during the compressor actuation time, and the in-valve small-opening release passage with a relatively small opening degree, which is used during both the compressor actuation time and the normal control time (i.e., Pd→Pc control time), can be formed using different passages. Therefore, in comparison with the conventional control valve, in which such passages are basically formed using a common (i.e., single) passage, the opening degree of each of the in-valve large-opening and small-opening release passages can be easily regulated, and thus, internal circulation of refrigerant within the compressor can be effectively reduced and the operation efficiency of the compressor can be effectively improved.

BRIEF DESCRIPTION OF THE DRAWINGS

In the drawings,

FIG. 6 is a view used for the illustration of the operation of an embodiment of the variable-capacity compressor control valve in accordance with the present disclosure;

FIG. 8A is a view of the normal control time and FIG. 8B is a view of the compressor actuation time.

DETAILED DESCRIPTION

Hereinafter, embodiments of the present disclosure will be described with reference to the drawings.

Figure 1:
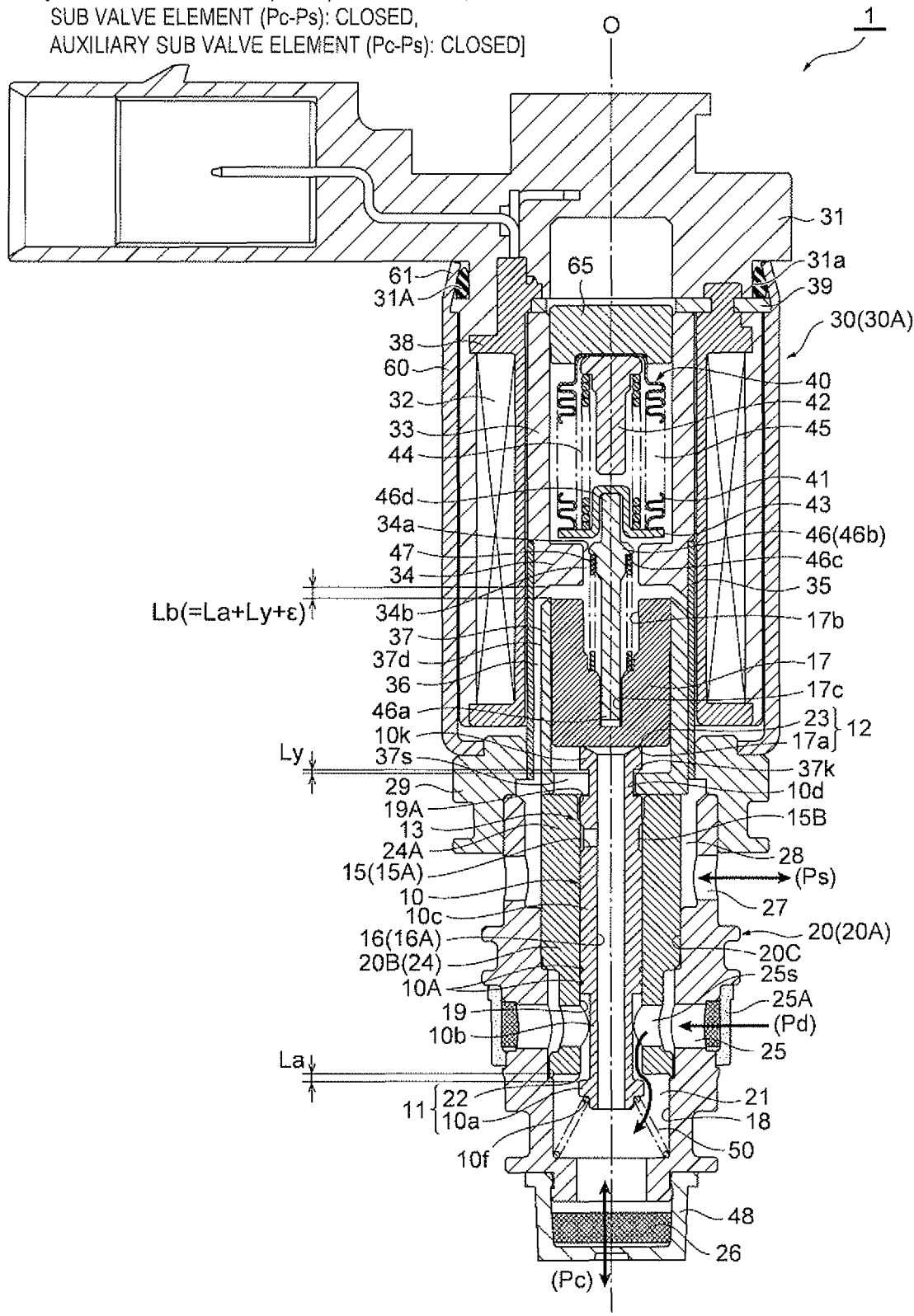
FIG. 1 is a longitudinal sectional view illustrating an embodiment of the variable-capacity compressor control valve in accordance with the present disclosure in which the main valve element is in the fully open position, the sub valve element is in the closed position, and the auxiliary sub valve element is in the closed position (i.e., during the normal control time (power-off time))
Figure 2:
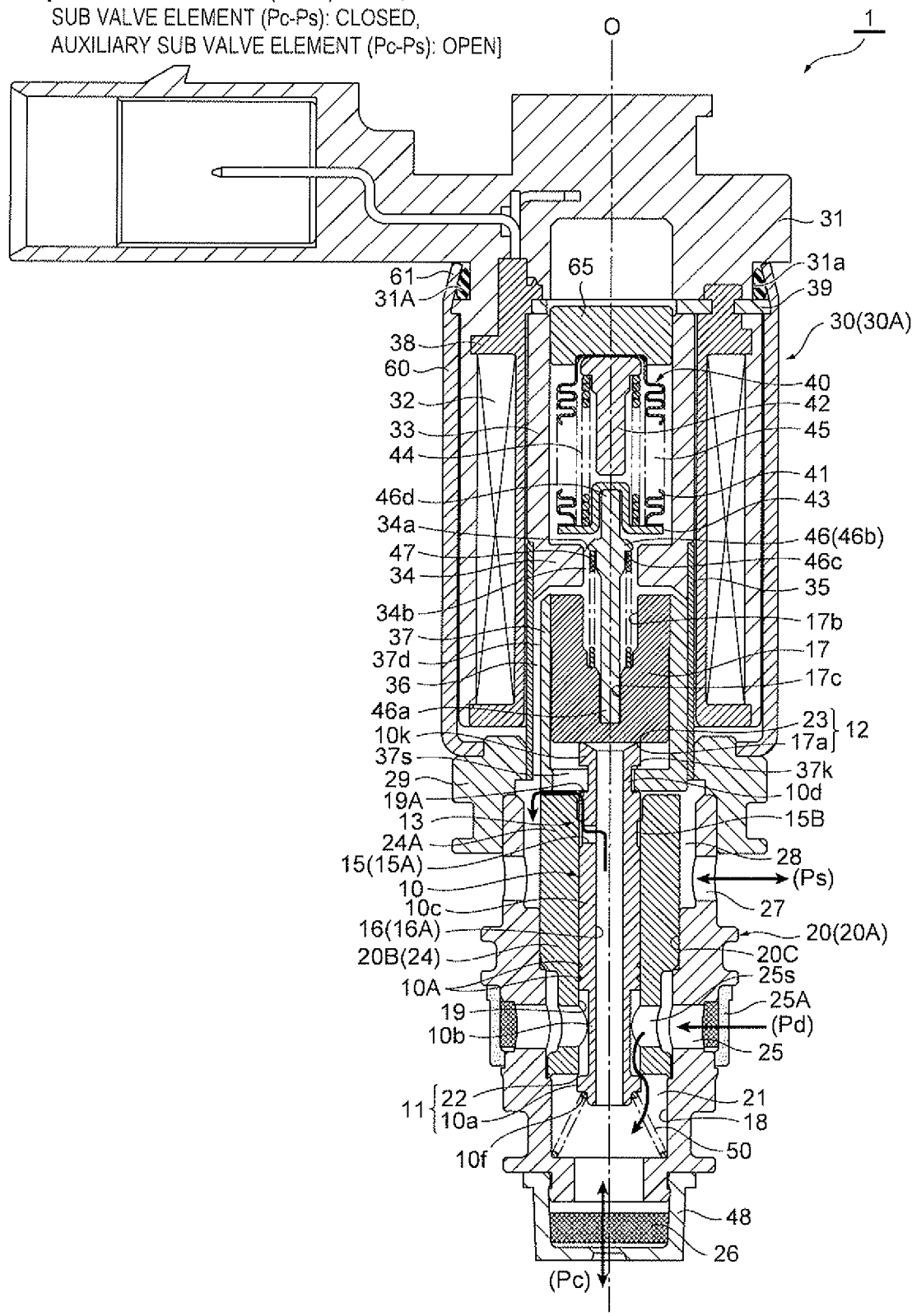
FIG. 2 is a longitudinal sectional view illustrating an embodiment of the variable-capacity compressor control valve in accordance with the present disclosure in which the main valve element is in the open position, the sub valve element is in the closed position, and the auxiliary sub valve element is in the open position (i.e., during the normal control time (power-on time))
Figure 3:
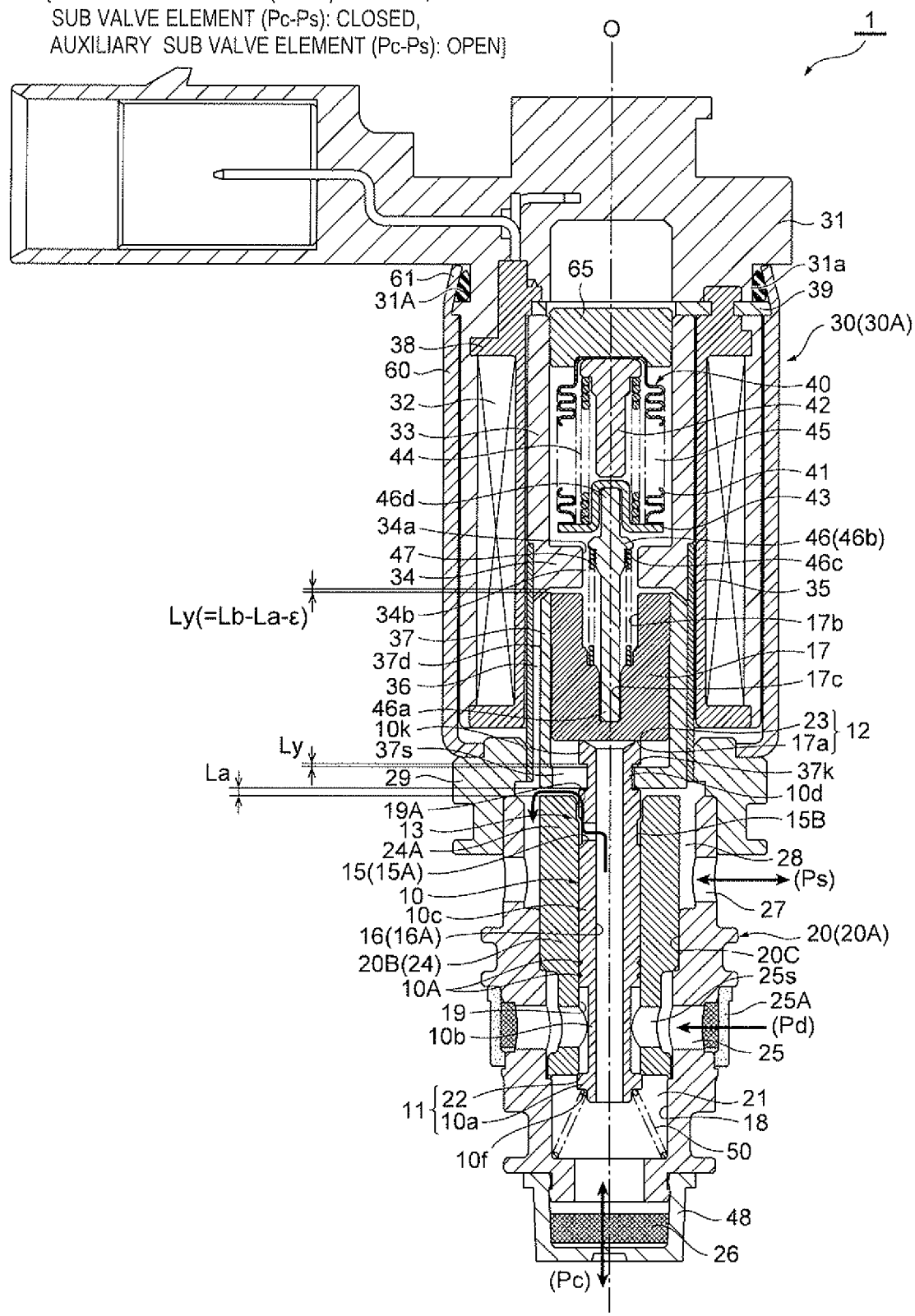
FIG. 3 is a longitudinal sectional view illustrating an embodiment of the variable-capacity compressor control valve in accordance with the present disclosure in which the main valve element is in the closed position, the sub valve element is in the closed position, and the auxiliary sub valve element is in the open position (i.e., at the time of transition to compressor actuation)
Figure 4:
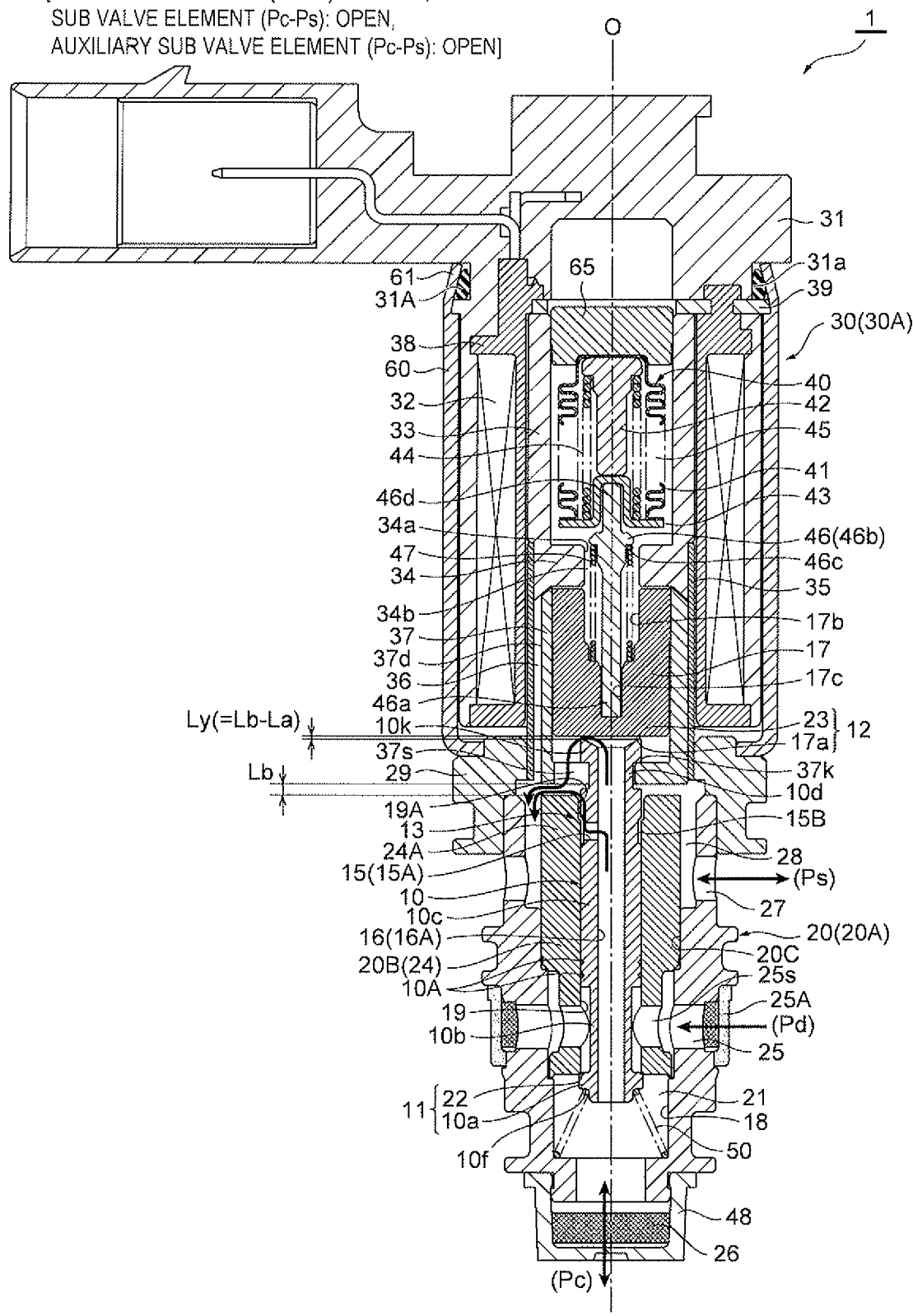
FIG. 4 is a longitudinal sectional view illustrating an embodiment of the variable-capacity compressor control valve in accordance with the present disclosure in which the main valve element is in the closed position, the sub valve element is in the open position, and the auxiliary sub valve element is in the open position (i.e., during the compressor actuation time)

FIGS. 1 to 4 are longitudinal sectional views each illustrating an embodiment of the variable-capacity compressor control valve in accordance with the present disclosure. Specifically, FIG. 1 is a view in which the main valve element is in the fully open position, the sub valve element is in the closed position, and the auxiliary sub valve element is in the closed position (i.e., during the normal control time (power-off time)), FIG. 2 is a view in which the main valve element is in the open position, the sub valve element is in the closed position, and the auxiliary sub valve element is in the open position (i.e., during the normal control time (power-on time)), FIG. 3 is a view in which the main valve element is in the closed position, the sub valve element is in the closed position, and the auxiliary sub valve element is in the open position (i.e., at the time of transition to compressor actuation), and FIG. 4 is a view in which the main valve element is in the closed position, the sub valve element is in the open position, and the auxiliary sub valve element is in the open position (i.e., during the compressor actuation time). It should be noted that FIG. 2 illustrates a state in which the valve opening degree of a valve orifice 22 is regulated (from the fully open position to a position in which the valve opening degree is small) by supplying current to an electromagnetic actuator 30 and thus energizing (i.e., turning on) the electromagnetic actuator 30 during the power-on control time (from the state in FIG. 1).

It should be noted that in the present specification, descriptions indicating the positions or directions, such as upper, lower, top, bottom, left, right, front, and rear, are used for the sake of convenience in accordance with the drawings to avoid complexity in the description, but such descriptions do not necessarily indicate the actual positions or directions when the control valve of the present disclosure is incorporated into a compressor.

In addition, in each drawing, a gap formed between some members, a clearance between some members, and the like may be depicted larger or smaller than their actual dimensions to help understand the present disclosure and also for the sake of convenience to create the drawing.

A control valve 1 in the illustrated embodiment basically includes a valve body 20 with a valve orifice 22; a main valve element 10 for opening or closing the valve orifice 22; an electromagnetic actuator 30 for moving the main valve element 10 in the direction to open or close the valve orifice (i.e., in the vertical direction); and a bellows device 40 as a pressure-sensitive reaction member.

The electromagnetic actuator 30 includes a bobbin 38, an energization coil 32 wound around the bobbin 38, a stator 33 and an attractor 34 arranged on the inner peripheral side of the coil 32, a guide pipe 35 whose upper end is joined by welding to the outer periphery of the lower end (i.e., a step portion) of the stator 33 and the attractor 34, a cylindrical plunger 37 having a bottom and arranged such that it is vertically slidable on the inner peripheral side of the guide pipe 35 below the attractor 34, a cylindrical housing 60 having a hole with a bottom and externally arranged around the coil 32, a connector portion 31 attached to the upper side of the housing 60 with an attachment plate 39 interposed therebetween, and a holder 29 arranged between the lower end (i.e., a hole at the bottom) of the housing 60 and the lower end of the guide pipe 35 and adapted to fix them to the upper portion of the valve body 20 (or a body member 20A thereof). In this example, the attractor 34 with a cylindrical shape and having an insertion through-hole 34a, which has a smaller diameter than the inside diameter of the stator 33, formed in the center (along the axis O) of the attractor 34 is integrally molded with the inner periphery of the lower portion of the cylindrical stator 33. In addition, the upper end (i.e., a thin-walled portion) of the housing 60 is securely swaged to an annular groove 31a provided on the outer periphery of the connector portion 31 with an O-ring 31A, which is a sealing member, interposed therebetween (i.e., a swaged portion 61). Herein, a portion of the electromagnetic actuator 30 including the coil 32, the stator 33, the attractor 34, and the like and excluding the plunger 37 is referred to as a "solenoid portion 30A."

A stator 65 with a short columnar shape is securely attached to the upper portion of the stator 33 by press fitting or the like, and a pressure-sensitive chamber 45, which is adapted to receive a suction pressure Ps in a compressor, is formed between the stator 65 on the inner peripheral side of the stator 33 and the attractor 34. The pressure-sensitive chamber 45 has arranged therein the bellows device 40 as the pressure-sensitive reaction member that includes bellows 41, a downwardly projecting upper stopper 42, a downwardly recessed lower stopper 43, and a compression coil spring 44. Further, a stepped, bar-like pushrod 46, which is a thrust transmitting member, is disposed along the axis O below the bellows device 40. A portion of the pushrod 46 slightly above the center thereof has a large diameter (i.e., a large-diameter portion 46b), and an upper end 46d of the pushrod 46 is fitted and inserted in the recess of the lower stopper 43 and thus is supported therein, while the large-diameter portion 46b of the pushrod 46 is inserted through the insertion through-hole 34a of the attractor 34 (with a small clearance 34b). The lower portion of the pushrod 46 is inserted in a recess hole 17b of a sub valve element 17 with a recessed cross-section described below, and a lower end 46a thereof is fitted in a recessed fit-insertion hole 17c formed in the center of the bottom of the recess hole 17b.

The sub valve element 17 with the recessed cross-section and having the recess hole 17b, which has approximately the same diameter as that of the insertion through-hole 34a of the attractor 34, is securely inserted into the plunger 37 by press fitting or the like, so that the sub valve element 17 and the plunger 37 can move up and down together. The upper end of the sub valve element 17 is aligned with the upper end of the plunger 37 (i.e., the upper end of the sub valve element 17 is positioned with respect to the inner periphery of the upper end of the plunger 37), while the lower end of the sub valve element 17 is fitted into the plunger 37 with a clearance secured between the lower end of the sub valve element 17 and the bottom of the plunger 37 (with a clearance that allows a flanged latch portion 10k of the main valve element 10 to slightly move vertically, which will be described in detail later). The fit-insertion hole 17c, which is recessed and adapted to have fit-inserted therein the lower end 46a of the pushrod 46, is formed in the center of the bottom of the recess hole 17b of the sub valve element 17.

In addition, a plunger spring (i.e., a valve-opening spring) 47, which is a cylindrical compression coil spring, is provided in a compressed state between a step portion (i.e., an annular terrace face facing downward) formed on the upper portion of the large-diameter portion 46b of the pushrod 46, and the bottom of the recess hole 17b (i.e., a face thereof facing upward around the fit-insertion hole 17c) of the sub valve element 17 fitted in the plunger 37. With the plunger spring 47 (or the compression force thereof), the plunger 37 is urged downward (i.e., in the direction to open the valve) via the sub valve element 17, and the bellows device 40 is held within the pressure-sensitive chamber 45 via the pushrod 46. With the plunger spring 47 (or the compression force thereof), the sub valve element 17 is urged in the direction to close an in-valve large-opening release passage 16 (or a release through-hole 16A; described below). The lower end (which is a planar face) of the sub valve element 17 is a sub valve element portion 17a that is adapted to open or close the in-valve large-opening release passage 16 (described in detail later).

Figure 9:
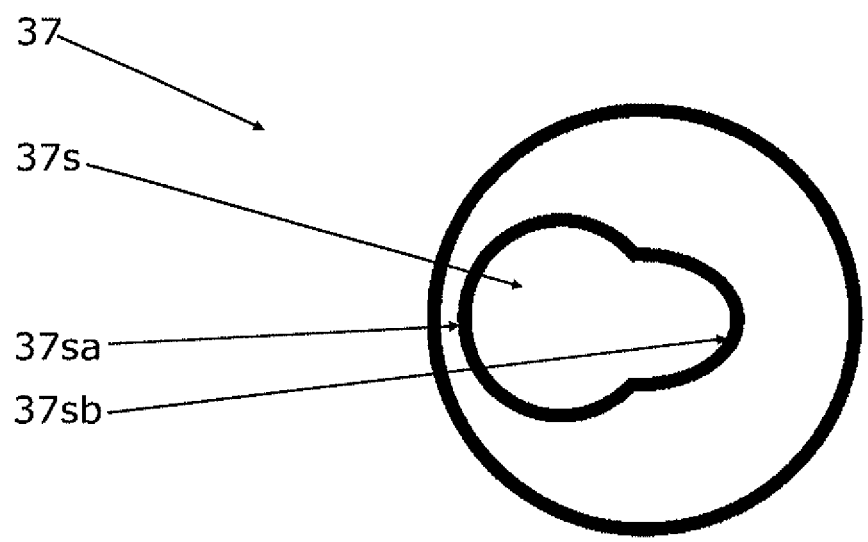
FIG. 9 shows the bottom of the plunger of FIGS. 1-4.

The plunger 37 has formed on its bottom a slit 37s that extends linearly to the center (on the axis O) from an area around the outer periphery thereof and has a through-hole for passing the flanged latch portion 10k of the main valve element 10. The height (in the vertical direction) of the slit 37s (i.e., the thickness (or the height in the vertical direction) of the bottom of the plunger 37) is set slightly smaller than the height of an upper small-diameter portion 10d of the main valve element 10 so that the main valve element 10 is vertically movable with respect to the plunger 37 (which will be described in detail later). In addition, the width (in the horizontal direction) of the slit 37s is set slightly larger than the outside diameter of the upper small-diameter portion 10d of the main valve element 10 and smaller than the outside diameter of the flanged latch portion 10k of the main valve element 10, taking into consideration the assembly property and the like. The outer peripheral portion of the slit 37s on the upper face of the bottom of the plunger 37 is an inner flanged latch portion 37k to which the flanged latch portion 10k of the main valve element 10 is adapted to be latched. FIG. 9 shows the bottom of the plunger 37 with the slit 37s viewed along the vertical direction. In this view, the contour of this slit 37s may be at least partly formed by a first circular contour segment 37sa and at least partly by an elliptical contour segment 37sb, in particular by a second circular contour 37sb.

In this example, a communication groove 37d including a D-cut surface or one or more vertical grooves, for example, is formed in a predetermined position on the outer periphery of the plunger 37 (i.e., on the side where the slit 37s is formed in the example illustrated in the drawing), and a gap 36 is formed between the outer periphery of the plunger 37 and the inner periphery of the guide pipe 35.

The main valve element 10 arranged below the plunger 37 and the sub valve element 17 is made of non-magnetic metal, for example, and is formed of a stepped shaft-like member arranged along the axis O. The main valve element 10 includes, arranged sequentially from the bottom side, a main valve element portion 10a with a relatively large diameter, a lower small-diameter portion 10b, an intermediate fit-inserted portion 10c that is long in the vertical direction, the upper small-diameter portion 10d, and the flanged latch portion 10k. Annular grooves 10A are arranged in two stages in the vertical direction on the outer periphery of the lower portion of the intermediate fit-inserted portion 10c.

As described above, the upper small-diameter portion 10d of the main valve element 10 is loosely fitted in the slit 37s, and the flanged latch portion 10k is loosely fitted in a portion below the sub valve element 17 on the inner side of the plunger 37 (i.e., in a space between the bottom of the plunger 37 and the lower end of the sub valve element 17). The flanged latch portion 10k has a smaller diameter than that of the sub valve element 17 and a larger diameter than the width of the slit 37s so that when the plunger 37 is moved upward with respect to the main valve element 10, the inner flanged latch portion 37k made of the outer peripheral portion of the slit 37s is latched to the flanged latch portion 10k, and thus, latching is achieved and slippage is prevented. In addition, the intermediate fit-inserted portion 10c also has a slightly larger diameter than the width of the slit 37s and a smaller diameter than the outside diameter of the plunger 37.

Figure 5:
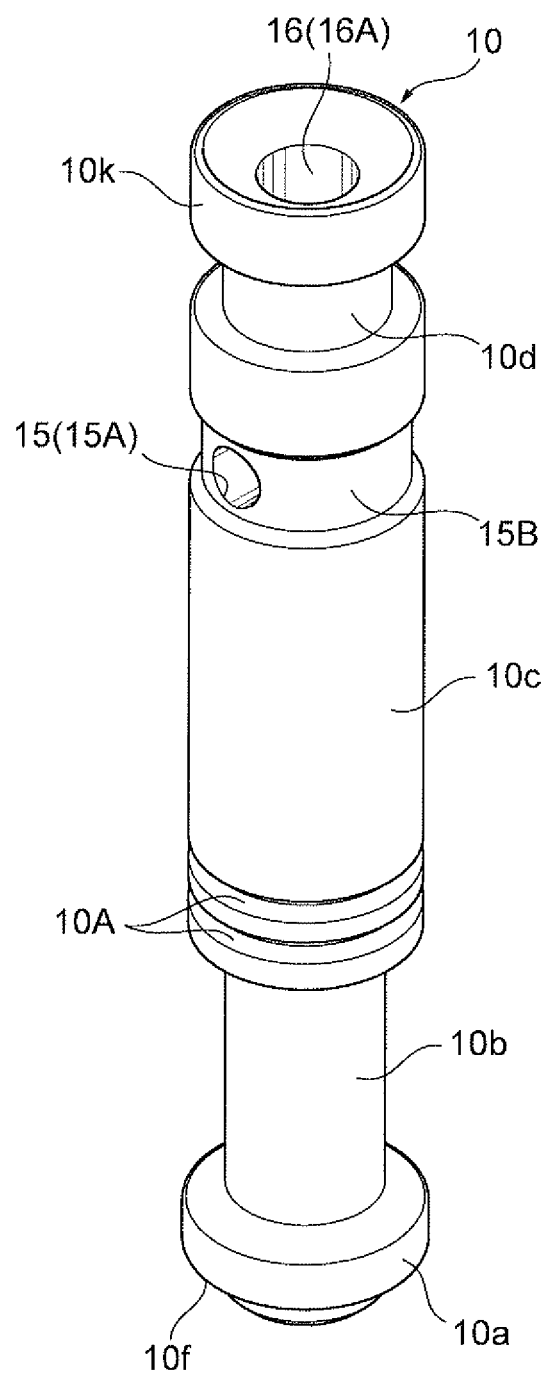
FIG. 5 is a perspective view of the appearance of the main valve element used for the variable-capacity compressor control valve in accordance with the present disclosure.

In this example, the release through-hole 16A, which partially forms the in-valve large-opening release passage 16 (described below), is formed such that it penetrates through the center of the main valve element 10 in the vertical direction (i.e., along the axis O), and further, the intermediate fit-inserted portion 10c has formed therein a communication hole 15A including a horizontal hole that partially forms an in-valve small-opening release passage 15 (described below) together with the release through-hole 16A, and also has formed therein an outer peripheral groove 15B including an annular recess groove that passes through the outer peripheral portion (i.e., an outer opening) of the communication hole 15A (i.e., continuous with the communication hole 15A) (see FIG. 5).

Meanwhile, the valve body 20 has a two-split structure that includes a stepped cylindrical body member 20A having a fit recess hole 20C in the center of the upper portion thereof and also having a housing hole 18, which has a slightly smaller diameter than that of the recess hole 20C and is continuous with the recess hole 20C, in the center of the lower portion thereof; and a cylindrical seat member 20B that is securely inserted into the recess hole 20C by press fitting or the like.

The seat member 20B is produced from stainless steel (SUS), a high-hardness brass material, or the like, and has a stopper portion 24A for defining the lowest position of the plunger 37, provided in a protruding manner on the upper side of a stepped fit-inserted portion 24 that is fitted and inserted in the recess hole 20C (i.e., such that the stopper portion 24A protrudes beyond the fit-inserted portion 24 toward the Ps inlet/outlet chamber 28). In this example, the outside diameter of the seat member 20B (or the stopper portion 24A thereof) is slightly smaller than the outside diameter of the plunger 37, and the upper end face of the stopper portion 24A (i.e., a face that is opposite and in contact with the plunger 37) is a circular planar face. The lower end of the seat member 20B (or the fit-inserted portion 24 thereof) is made to abut a step portion (i.e., a terrace portion) between the recess hole 20C and the housing hole 18 of the body member 20A. In addition, a guide hole 19 in which the intermediate fit-inserted portion 10c of the main valve element 10 is adapted to be slidably fitted and inserted is formed in the center of the seat member 20B such that it penetrates through the center of the seat member 20B in the vertical direction (i.e., along the axis O), and the lower end of the guide hole 19 is the valve orifice (i.e., the valve seat portion) 22 that is adapted to be opened or closed by the main valve element portion 10a provided at the lower end of the main valve element 10. Herein, the main valve element portion 10a and the valve orifice 22 form a main valve unit 11.

In this example, an inner peripheral groove 19A, which includes an annular step with a predetermined depth (or height) in the vertical direction and partially forms the in-valve small-opening release passage 15 (described below), is formed on the upper end of the guide hole 19 (i.e., on the inner peripheral face of the seat member 20B).

The body member 20A is produced from a material, such as aluminum, brass, or resin. A Ps inlet/outlet chamber 28 for the suction pressure Ps in the compressor is formed around the outer periphery of the stopper portion 24A (i.e., within the body member 20A on the upper end side of the seat member 20B), and a plurality of Ps inlet/outlet ports 27 are formed on the outer peripheral side of the Ps inlet/outlet chamber 28 in a state in which the seat member 20B (or the fit-inserted portion 24 thereof) is inserted in the recess hole 20C of the body member 20A. The suction pressure Ps introduced into the Ps inlet/outlet chamber 28 through the Ps inlet/outlet ports 27 is introduced into the pressure-sensitive chamber 45 via the gap 36 formed between the outer periphery of the plunger 37 and the guide pipe 35 (i.e., a gap formed by the communication groove 37d), the clearance 34b formed between the outer periphery of the pushrod 46 and the attractor 34, and the like.

In addition, the housing hole 18, which has a larger diameter than those of the guide hole 19 and the main valve element portion 10a, for housing the main valve element portion 10a of the main valve element 10, is provided continuously with the center of the bottom of the recess hole 20C of the body member 20A. A valve-closing spring 50, which is a conical compression coil spring, is provided in a compressed state between the corner portion of the outer periphery of the bottom of the housing hole 18 and a step portion (i.e., a terrace portion) 10f provided on the outer periphery of the lower portion of the main valve element portion 10a of the main valve element 10. Thus, with the urging force of the valve-closing spring 50, the main valve element 10 is urged in the direction to close the valve (i.e., upward), and the main valve element 10 (i.e., the upper end of the flanged latch portion 10k thereof) is pressed against the sub valve element 17 (or the lower face thereof). Herein, the inside of the housing hole 18 (i.e., a portion below the valve orifice 22 of the seat member 20B) is a valve chamber 21.

A plurality of Pd introduction ports 25 communicating with a discharge chamber of the compressor are provided in the recess hole 20C, and a ring-like filter member 25A is arranged around the outer periphery of the Pd introduction ports 25. In addition, a plurality of horizontal holes 25s communicating with the Pd introduction ports 25 and continuous with the guide hole 19 are provided in the fit-inserted portion 24 of the seat member 20B that is inserted in the recess hole 20C (in particular, at positions below a portion of the fit-inserted portion 24 in which the intermediate fit-inserted portion 10c of the main valve element 10 is inserted and on the side upstream of the valve orifice 22).

In addition, the lower end of the body member 20A has a lid-like member 48, which functions as a filter, fixed thereto by engagement, press fitting, or the like. A Pc inlet/outlet chamber (or an inlet/outlet port) 26, which communicates with a crank chamber of the compressor, is provided above the lid-like member 48 and below the housing hole 18 (i.e., within the body member 20A on the lower end side of the seat member 20B and on the side downstream of the valve orifice 22). The Pc inlet/outlet chamber (or the inlet/outlet port) 26 communicates with the Pd introduction ports 25 via the valve chamber 21→the gap between the valve orifice 22 and the main valve element portion 10*a*→the gap between the lower portion of the guide hole 19 and the lower small-diameter portion 10*b*→the horizontal holes 25*s* of the fit-inserted portion 24.

Further, in this embodiment, the release through-hole 16A for allowing the Pc inlet/outlet chamber 26 and the Ps inlet/outlet chamber 28 (i.e., the Ps inlet/outlet ports 27) to communicate with each other, is provided such that it penetrates through the center of the inside of the main valve element 10 in the vertical direction (i.e., in the direction of the axis O).

Such release through-hole 16A partially forms the in-valve large-opening release passage 16, and the upper end of the release through-hole 16A (i.e., the upper end of the main valve element 10) is a sub valve seat portion 23 with/from which the lower end (i.e., sub valve element portion) 17*a* of the sub valve element 17 is adapted to be moved into contact or away.

The sub valve element 17 is, as described above, securely inserted in the plunger 37 above the main valve element 10. The outside diameter of the sub valve element 17 (=the inside diameter of the plunger 37) is larger than the outside diameter of the flanged latch portion 10*k* of the main valve element 10, and the lower end (which is a planar face) of the sub valve element 17 is the sub valve element portion 17*a* that is adapted to move into contact with or away from the sub valve seat portion (i.e., an inverted truncated cone surface portion) 23, which is the upper end edge of the release through-hole 16A, so as to open or close the in-valve large-opening release passage 16 (or the release through-hole 16A). Herein, the sub valve seat portion 23 and the sub valve element portion 17*a* form a sub valve unit 12.

In this embodiment, as described above, the Pc inlet/outlet chamber 26, the valve chamber 21, the release through-hole 16A formed in the main valve element 10, the inside of the plunger 37, the Ps inlet/outlet chamber 28, and the like form the in-valve large-opening release passage 16 for releasing the crank chamber pressure Pc to the suction chamber of the compressor via the Ps inlet/outlet ports 27. The in-valve large-opening release passage 16 is adapted to be opened or closed as the sub valve element portion (i.e., the lower end) 17*a* of the sub valve element 17 is moved into contact with or away from the sub valve seat portion 23 that is the upper end edge of the release through-hole 16A.

Further, in this embodiment, in addition to the aforementioned configuration, the communication hole 15A, which extends laterally (i.e., in the direction perpendicular to the axis O) from the release through-hole 16A formed in the main valve element 10 to the outer peripheral face (specifically, to the sliding surface of the main valve element 10 that is adapted to slide on the seat member 20B of the valve body 20) and includes a horizontal hole with a smaller diameter than that of the release through-hole 16A, to allow the Pc inlet/outlet chamber 26 and the Ps inlet/outlet chamber 28 (or the Ps inlet/outlet ports 27) to communicate with each other in an auxiliary manner, is provided in the upper portion of the intermediate fit-inserted portion 10*c* of the main valve element 10, and the outer peripheral groove 15B including an annular recess groove, which passes through the outer peripheral portion (i.e., an outer opening) of the communication hole 15A, is provided on the outer peripheral face of the intermediate fit-inserted portion 10*c*. That is, in this example, the communication hole 15A extends laterally from the upper portion of the release through-hole 16A, and opens on the outer peripheral face thereof (or on the outer peripheral groove 15B provided therein).

In addition, the inner peripheral groove 19A, which has a predetermined depth (or height) in the vertical direction and includes an annular step that opens on the Ps inlet/outlet chamber 28 side (i.e., on the upper side), is provided around the upper end of the inner peripheral face (i.e., the guide hole 19) of the seat member 20B of the valve body 20 in which the intermediate fit-inserted portion 10*c* of the main valve element 10 is adapted to be inserted (i.e., around the upper side of the sliding surface of the seat member 20B on which the intermediate fit-inserted portion 10*c* of the main valve element 10 is adapted to slide). The inner peripheral groove 19A is located above the communication hole 15A and the outer peripheral groove 15B when the main valve element 10 is at the lowest position (i.e., when the lowermost end face of the plunger 37 abuts the stopper portion 24A and thus is at the lowest position, causing the valve orifice 22 to be in the fully open position during the power-off time of the electromagnetic actuator 30 (or the solenoid portion 30A thereof)), and is formed at a position overlapping (or continuous with) the communication hole 15A and the outer peripheral groove 15B (or the upper portion thereof) when the plunger 37 is continuously moved upward from the lowest position by the attraction force of the electromagnetic actuator 30 and the main valve element 10 is also moved upward together with the plunger 37.

The communication hole 15A and the outer peripheral groove 15B provided in the main valve element 10, and the inner peripheral groove 19A provided in the valve body 20 partially form the in-valve small-opening release passage 15 together with the release through-hole 16A, and the main valve element 10 moves vertically with respect to the valve body 20 so that the outer peripheral portion (i.e., the outer opening) of the communication hole 15A (and the outer peripheral groove 15B) is adapted to be in sliding contact with the inner peripheral face (i.e., the guide hole 19) of the seat member 20B of the valve body 20 and thus open or close the in-valve small-opening release passage 15 (or the communication hole 15A). That is, herein, the outer peripheral portion (i.e., the outer opening) of the communication hole 15A (and the outer peripheral groove 15B) and the inner peripheral face (i.e., the guide hole 19) of the seat member 20B of the valve body 20 form the auxiliary sub valve unit 13 in the in-valve small-opening release passage 15.

In this embodiment, as described above, the Pc inlet/outlet chamber 26; the valve chamber 21; the release through-hole 16A, the communication hole 15A, and the outer peripheral groove 15B that are provided in the main valve element 10; the inner peripheral groove 19A that is provided in the valve body 20, the Ps inlet/outlet chamber 28, and the like form the in-valve small-opening release passage 15 for releasing the crank chamber pressure Pc to the suction chamber of the compressor via the Ps inlet/outlet ports 27, and the in-valve small-opening release passage 15 is adapted to be opened or closed as the outer peripheral portion (i.e., the outer opening) of the communication hole 15A (and the outer peripheral groove 15B) slidingly contacts the inner peripheral face (i.e., the guide hole 19) of the seat member 20B of the valve body 20 along with a vertical motion of the main valve element 10 with respect to the valve body 20.

It is needless to mention that the methods for forming the in-valve large-opening release passage 16 (or the release through-hole 16A) and the in-valve small-opening release passage 15, the shape, arrangement, and the like thereof, as well as the methods for opening or closing the in-valve large-opening release passage 16 and the in-valve small-opening release passage 15 are not limited to the examples illustrated in the drawings.

In addition, although the aforementioned embodiment illustrates an example in which the valve body 20 includes two components that are the body member 20A and the seat member 20B, it is needless to mention that the valve body 20 may be formed using a single component, for example.

Herein, in the control valve 1 of this embodiment, when the plunger 37, the main valve element 10, and the sub valve element 17 are at the lowest position (i.e., when the bottom end face of the plunger 37 abuts the stopper portion 24A, the main valve unit 11 is in the fully open position, the sub valve unit 12 is in the fully closed position, and the auxiliary sub valve unit 13 is in the fully closed position) as illustrated in FIG. 1, a clearance in the vertical direction between the main valve element portion 10a of the main valve element 10 and the valve orifice (i.e., the valve seat portion) 22 is represented by a first lift amount La, and a clearance between the inner flanged latch portion 37k of the plunger 37 and the flanged latch portion 10k of the main valve element 10 is represented by a predetermined amount Ly. The maximum lift amount (i.e., a second lift amount) Lb of the plunger 37 (i.e., the lift amount of from the lowest position to the highest position of the plunger 37) corresponds to the first lift amount La+ the predetermined amount Ly. The length Lb between plunger 37 and attractor 34 may equal La+Ly+ε, where ε is a small distance, to account for part tolerances and wear of seat At this time, the communication hole 15A and the outer peripheral groove 15B provided in the main valve element 10 (or the intermediate fit-inserted portion 10c thereof) are located immediately below the inner peripheral groove 19A provided in the valve body 20 (or the seat member 20B thereof).

Next, the operation of the control valve 1 with the aforementioned configuration will be described.

Figure 6:
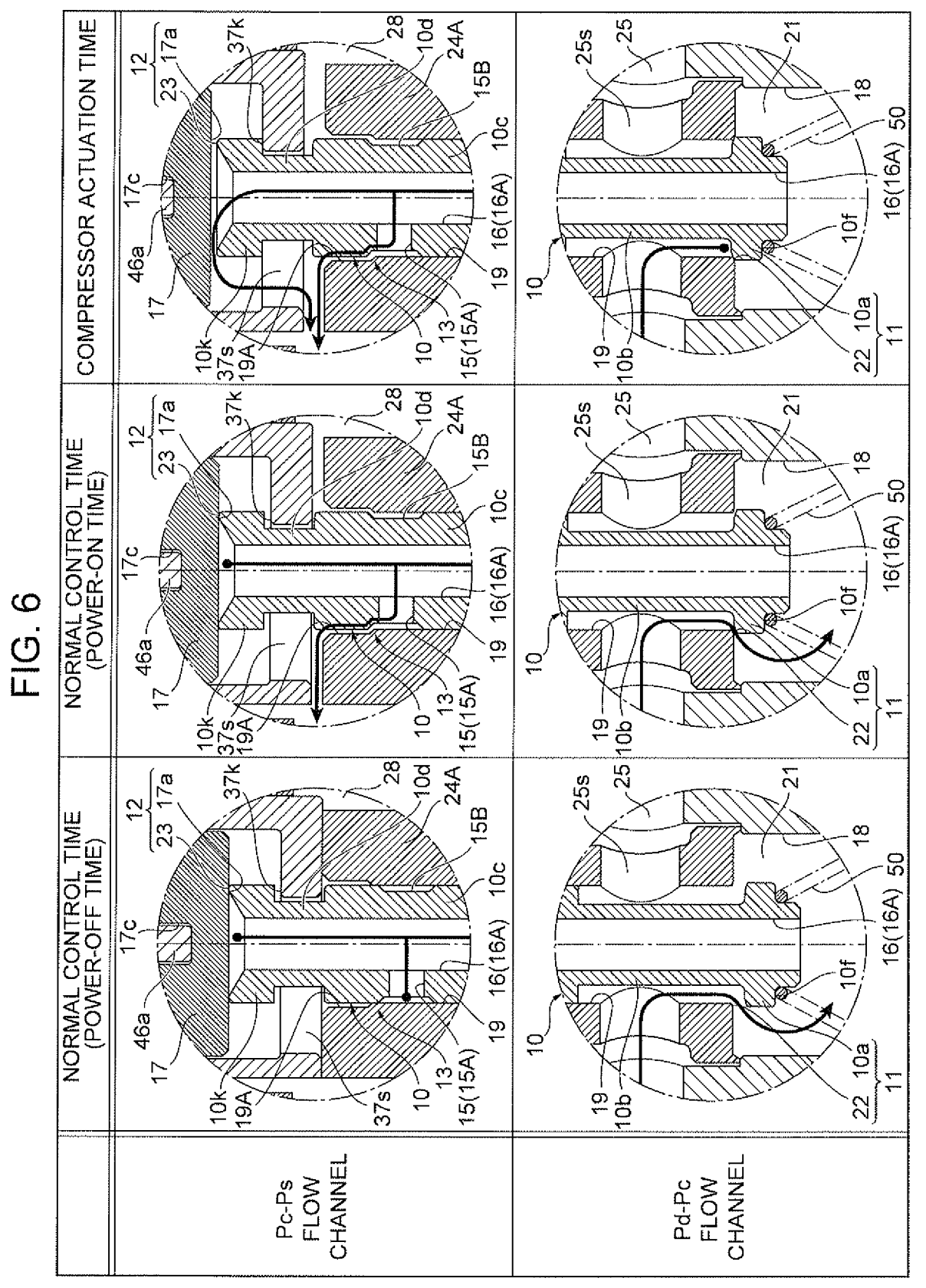
Figure 7:
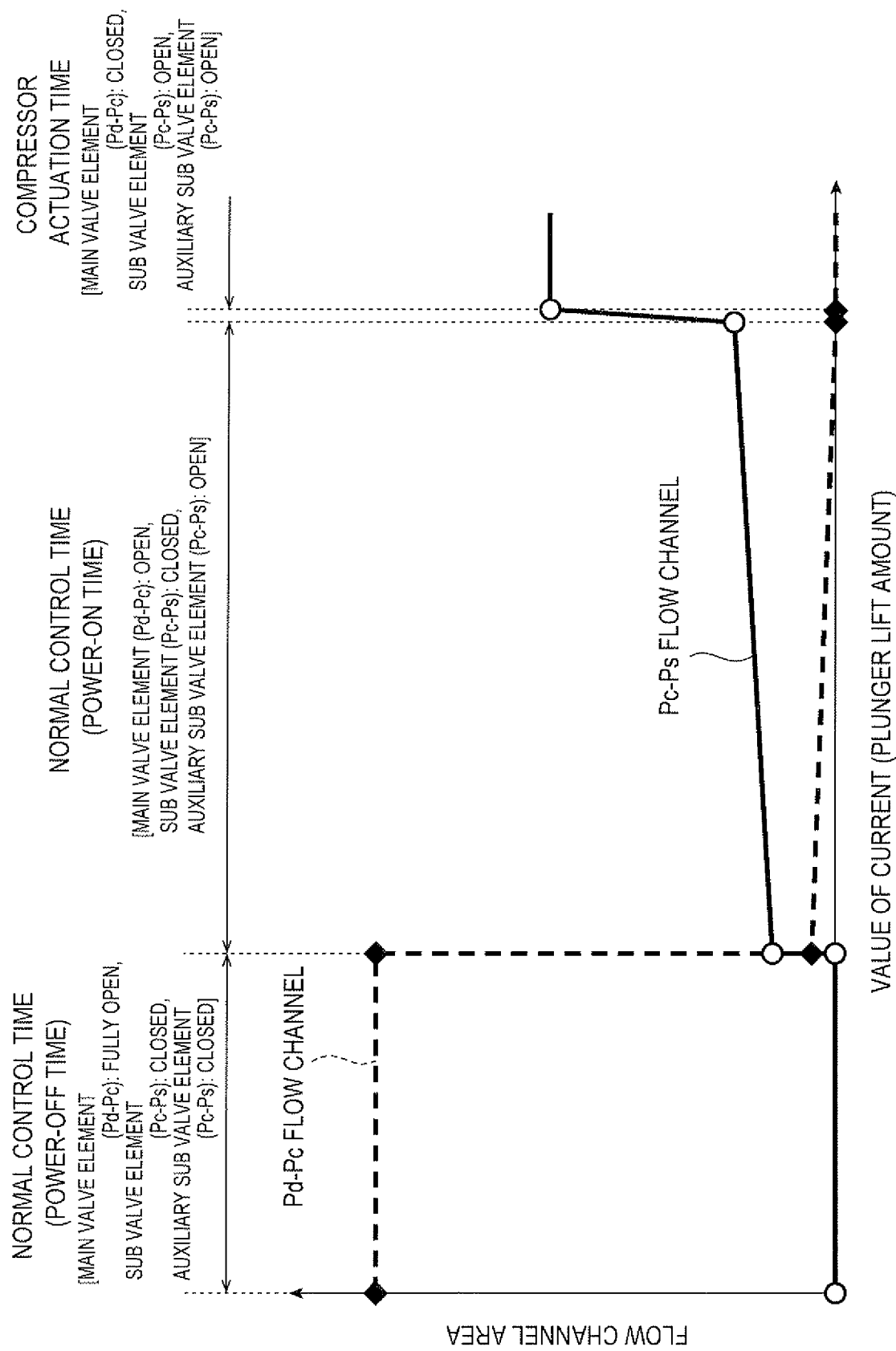
FIG. 7 is a diagram illustrating the relationship between the value of current flowing through the electromagnetic actuator (i.e., plunger lift amount) and the flow channel areas of the Pd-Pc flow channel and the Pc-Ps flow channel in the operation of an embodiment of the variable-capacity compressor control valve in accordance with the present disclosure.
Figure 8A:
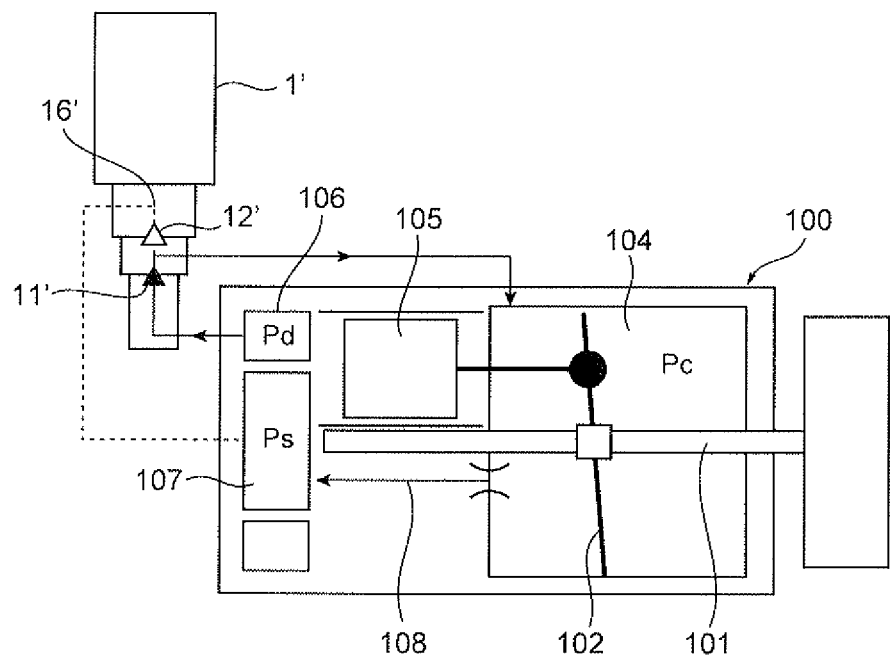
FIGS. 8A and 8B are views illustrating the circulation state of a refrigerant pressure between a compressor and a control valve of the conventional art; specifically.
Figure 8B:
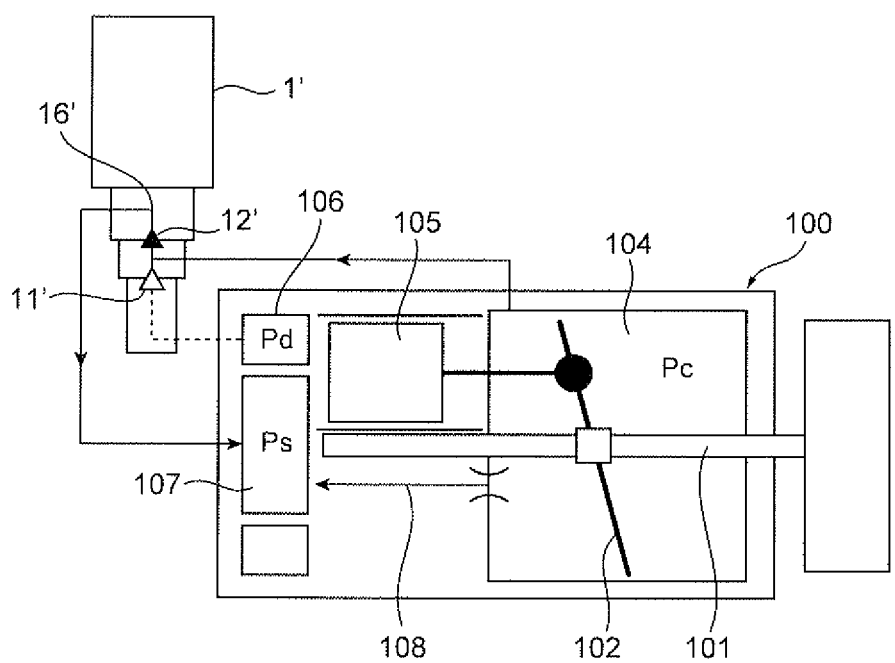

FIG. 6 is a view used for the illustration of the operation of an embodiment of the variable-capacity compressor control valve in accordance with the present disclosure, which illustrates changes in the circulation state of refrigerant flowing through the Pd-Pc flow channel and the Pc-Ps flow channel. FIG. 7 is a diagram illustrating the relationship between the value of current flowing through the electromagnetic actuator (i.e., plunger lift amount) and the flow channel areas of the Pd-Pc flow channel and the Pc-Ps flow channel in the operation of an embodiment of the variable-capacity compressor control valve in accordance with the present disclosure.

The control valve 1 of this example is configured such that during the power-off time of the electromagnetic actuator 30 (or the solenoid portion 30A thereof) (i.e., when the valve orifice 22 is in the fully open position), the in-valve small-opening release passage 15 is blocked within the main valve element 10 (i.e., the in-valve small-opening release passage 15 is closed), and during the power-on time of the electromagnetic actuator 30 (or the solenoid portion 30A thereof) (i.e., when the valve opening degree of the valve orifice 22 is controlled or when the valve orifice 22 is closed), the communication hole 15A and the outer peripheral groove 15B provided in the main valve element 10 (or the intermediate fit-inserted portion 10c thereof) communicate with the inner peripheral groove 19A provided in the valve body 20 (or the seat member 20B thereof), so that the crank chamber pressure Pc is released to the suction chamber via the in-valve small-opening release passage 15 (i.e., the in-valve small-opening release passage 15 is opened). During the power-off time, the bottom end of the pushrod 46 may be separate from mating surface of sub valve element 17. Thus, the in-valve small-opening release passage 15 may be closed by planar contact of the plunger 37 and the stopper portion 24A.

Specifically, during the normal control time (i.e., Pd→Pc control time), the lift amount of the plunger 37 (and the sub valve element 17) is slightly greater than the first lift amount La at the maximum, and during the compressor actuation time (i.e., Pc→Ps control time), the lift amount of the plunger 37 (and the sub valve element 17) is the second lift amount Lb.

That is, during the normal control time (i.e., Pd→Pc control time), when the solenoid portion 30A including the coil 32, the stator 33, the attractor 34, and the like is supplied with current and thus is energized after a power-off state (see FIG. 1), the plunger 37 and the sub valve element 17 are both attracted (upward) by the attractor 34, and following the movement of the plunger 37 and the sub valve element 17, the main valve element 10 is moved upward (i.e., in the direction to close the valve) by the urging force of the valve-closing spring 50. Meanwhile, the suction pressure Ps introduced from the compressor through the Ps inlet/outlet ports 27 is introduced into the pressure-sensitive chamber 45 through the Ps inlet/outlet chamber 28 via the gap 36 between the outer periphery of the plunger 37 and the guide pipe 35, and the like, and the bellows device 40 (i.e., the inside thereof is at a vacuum pressure) is expansively or contractively displaced in accordance with the pressure (i.e., the suction pressure Ps) in the pressure-sensitive chamber 45 (i.e., contracts if the suction pressure Ps is high, and expands if it is low), and the displacement is then transmitted to the main valve element 10 via the pushrod 46, the sub valve element 17, and the plunger 37, whereby the valve opening degree (i.e., the clearance between the valve orifice 22 and the main valve element portion 10a) is regulated, and the crank chamber pressure Pc is controlled in accordance with the valve opening degree (see FIGS. 1, 2, 6, and 7).

In this case, the main valve element 10 is always urged upward by the urging force of the valve-closing spring 50, while the sub valve element 17 is always urged downward by the urging force of the valve-opening spring 47. Therefore, the sub valve element portion 17a is in a state of being pressed against the sub valve seat portion 23 (i.e., the sub valve unit 12 is closed), and the in-valve large-opening release passage 16 is blocked within the main valve element 10. Therefore, there is no possibility that the crank chamber pressure Pc may be released to the suction chamber via the in-valve large-opening release passage 16 (see FIGS. 1, 2, and 6).

In addition, during the power-off time of the electromagnetic actuator 30 (or the solenoid portion 30A thereof) (see FIG. 1), as described above, the communication hole 15A and the outer peripheral groove 15B provided in the main valve element 10 (or the intermediate fit-inserted portion 10c thereof) are arranged below the inner peripheral groove 19A provided in the valve body 20 (or the seat member 20B thereof), and the outer peripheral portion (i.e., the outer opening) of the communication hole 15A (and the outer peripheral groove 15B) is closed by the inner peripheral face (i.e., the guide hole 19) of the seat member 20B of the valve body 20 (i.e., the auxiliary sub valve unit 13 is closed) so that the in-valve small-opening release passage 15 is also closed within the main valve element 10. Meanwhile, when the electromagnetic actuator 30 (or the solenoid portion 30A thereof) is supplied with current and thus is energized, the main valve element 10 moves (i.e., is lifted) upward with respect to the valve body 20 as the main valve element 10 is moved upward (in the direction to close the valve) along with the movement of the plunger 37, and the communication hole 15A and the outer peripheral groove 15B provided in the main valve element 10 (or the intermediate fit-inserted portion 10c thereof) are allowed to communicate with the inner peripheral groove 19A provided in the valve body 20 (or the seat member 20B thereof), whereby the in-valve small-opening release passage 15 is opened and the crank chamber pressure Pc is released to the suction chamber via the in-valve small-opening release passage 15. The opening degree of the in-valve small-opening release passage 15 (or the passage area, that is, the area of the Pc-Ps flow channel) gradually becomes larger as the upward lift amount of the plunger 37 and the main valve element 10 (in the direction to close the valve) becomes larger (see FIGS. 1, 2, 6, and 7).

That is, in the control valve 1 of this embodiment, during the normal control time (i.e., Pd→Pc control time), the crank chamber pressure Pc is released to the suction chamber only via the in-valve small-opening release passage 15 with a relatively small opening degree and whose opening degree (i.e., the area of the Pc-Ps flow channel) is variable in accordance with the upward lift amount of the plunger 37 and the main valve element 10 (in the direction to close the valve) while the in-valve large-opening release passage 16 remains closed by the sub valve element 17 (i.e., before the in-valve large-opening release passage 16 is opened by the sub valve element 17).

In contrast, during the compressor actuation time, the solenoid portion 30A is supplied with current and thus is energized, and the plunger 37 and the sub valve element 17 are both attracted (upward) by the attractor 34. Following the upward movement of the plunger 37 and the sub valve element 17, the main valve element 10 is also moved upward, and the valve orifice 22 is closed by the main valve element portion 10a of the main valve element 10. Then, the plunger 37 and the sub valve element 17 are further moved upward, whereby the sub valve element 17 opens the in-valve large-opening release passage 16, and thus, the crank chamber pressure Pc is released into the suction chamber via the in-valve large-opening release passage 16 (as well as the in-valve small-opening release passage 15) (see FIGS. 4, 6, and 7).

Specifically, until the lift amount (i.e., upward movement amount) of the plunger 37 (and the sub valve element 17) reaches the first lift amount La, the main valve element 10 is moved in the direction to close the valve by the urging force of the valve-closing spring 50 such that it follows the upward movement of the plunger 37 and the sub valve element 17. Then, when the upward movement amount reaches the first lift amount La, the valve orifice 22 is closed by the main valve element portion 10a of the main valve element 10 (i.e., the state illustrated in FIG. 3), and the plunger 37 and the sub valve element 17 are further moved upward by the predetermined amount Ly with the main valve unit 11 in the closed valve state (i.e., the state illustrated in FIG. 4). That is, after the upward movement amount of the plunger 37 and the sub valve element 17 has reached the first lift amount La, the sub valve element 17 is attracted toward the attractor 34 together with the plunger 37 by the predetermined amount Ly until the inner flanged latch portion 37k of the plunger 37 is latched to the flanged latch portion 10k of the main valve element 10 (i.e., the first lift amount La+ the predetermined amount Ly=the second lift amount Lb). In such a case, since the main valve element 10 remains still in the closed valve state, the sub valve element portion 17a of the sub valve element 17 is lifted from the sub valve seat portion 23 by the predetermined amount Ly, whereby the in-valve large-opening release passage 16 is opened. When the inner flanged latch portion 37k of the plunger 37 is latched to the flanged latch portion 10k of the main valve element 10, neither the plunger 37 nor the sub valve element 17 is lifted any further even if the solenoid portion 30A generates an attraction force.

That is, in the control valve 1 of this embodiment, the crank chamber pressure Pc is released to the suction chamber both via the in-valve small-opening release passage 15 with a relatively small opening degree and the in-valve large-opening release passage 16 with a relatively large opening degree during the compressor actuation time.

As described above, in the control valve 1 of this embodiment, since the crank chamber pressure Pc is released to the suction chamber via the in-valve large-opening release passage 16 during the compressor actuation time, it is possible to significantly shorten the time required to increase the discharge capacity during the compressor actuation time. In addition, since the in-valve large-opening release passage 16 is closed by the sub valve element 17 and the crank chamber pressure Pc is released to the suction chamber only via the in-valve small-opening release passage 15 during the normal control time (i.e., Pd→Pc control time), there is no possibility that the operation efficiency of the compressor would decrease.

In addition, in the control valve 1 of this embodiment, the in-valve large-opening release passage 16 with a relatively large opening degree, which is used during the compressor actuation time, and the in-valve small-opening release passage 15 with a relatively small opening degree, which is used during both the compressor actuation time and the normal control time (i.e., Pd→Pc control time), can be formed using different passages and are individually opened or closed. Therefore, in comparison with the conventional control valve in which such passages are basically formed using a common (i.e., single) passage, the opening degree of each of the in-valve large-opening and small-opening release passages can be easily regulated, and thus, internal circulation of refrigerant within the compressor 100 can be effectively reduced and the operation efficiency of the compressor 100 can be effectively improved.

Further, the opening area of the in-valve small-opening release passage 15 (i.e., the area of the Pc-Ps flow channel) is variable in accordance with the amount of movement (i.e., lift amount) of the main valve element 10 along with the movement of the plunger 37, and gradually becomes larger with an increase in the amount of movement (i.e., lift amount) of the main valve element 10. Therefore, the operation efficiency of the compressor 100 during the normal control time (i.e., Pd→Pc control time) can be more effectively improved.

LIST OF REFERENCE NUMERALS

1 Variable-capacity compressor control valve
10 Main valve element
10a Main valve element portion
10b Lower small-diameter portion
10c Intermediate fit-inserted portion
10d Upper small-diameter portion
10k Flanged latch portion
11 Main valve unit
12 Sub valve unit
13 Auxiliary sub valve unit
15 In-valve small-opening release passage
15A Communication hole
15B Outer peripheral groove 16 In-valve large-opening release passage
16A Release through-hole
17 Sub valve element
17a Sub valve element portion
18 Housing hole
19 Guide hole
19A Inner peripheral groove
20 Valve body
20A Body member
20B Seat member
20C Recess hole
21 Valve chamber
22 Valve orifice
23 Sub valve seat portion
24 Fit-inserted portion
24A Stopper portion
25 Pd introduction port
26 Pc inlet/outlet chamber (inlet/outlet port)
27 Ps inlet/outlet port
28 Ps inlet/outlet chamber
30 Electromagnetic actuator
30A Solenoid portion
32 Coil
33 Stator
34 Attractor
35 Guide pipe
37 Plunger
37s Slit
37sa First circular contour segment
37sb Elliptical contour segment
40 Bellows device (pressure-sensitive reaction member)
45 Pressure-sensitive chamber
46 Pushrod
47 Plunger spring
50 Valve-closing spring

What is claimed is:

1. A variable-capacity compressor control valve comprising: a valve body including a valve chamber with a valve orifice, a suction pressure inlet/outlet port communicating with a suction chamber of a compressor, a discharge pressure introduction port arranged upstream of the valve orifice and communicating with a discharge chamber of the compressor, and a crank pressure inlet/outlet port arranged downstream of the valve orifice and communicating with a crank chamber of the compressor; a main valve element adapted to open or close the valve orifice; an electromagnetic actuator including a plunger, the plunger being adapted to move the main valve element in a direction to open or close the valve orifice; a pressure-sensitive chamber adapted to receive a suction pressure from the compressor via the suction pressure inlet/outlet port; a pressure-sensitive reaction member adapted to urge the main valve element in the direction to open or close the valve orifice in accordance with a pressure in the pressure-sensitive chamber; an in-valve large-opening release passage adapted to release a crank pressure in the crank chamber to the suction chamber of the compressor via the suction pressure inlet/outlet port; a sub valve element adapted to open or close the in-valve large-opening release passage along with a movement of the plunger; and an in-valve small-opening release passage having a smaller opening area than that of the in-valve large-opening release passage, the in-valve small-opening release passage being adapted to release the crank pressure in the crank chamber to the suction chamber of the compressor via the suction pressure inlet/outlet port, wherein: the in-valve small-opening release passage is adapted to be opened or closed as the main valve element is moved along with a movement of the plunger, and is adapted to be opened before the in-valve large-opening release passage is opened by the sub valve element.

2. The variable-capacity compressor control valve according to claim 1, wherein the opening area of the in-valve small-opening release passage is variable in accordance with an amount of movement of the main valve element along with a movement of the plunger.

3. The variable-capacity compressor control valve according to claim 1, wherein the opening area of the in-valve small-opening release passage gradually decreases as the main valve gradually opens.

4. The variable-capacity compressor control valve according to claim 1,
wherein the main valve element is adapted to be slidably fitted and inserted in the valve body,
wherein the in-valve large-opening release passage includes a release through-hole, the release through-hole vertically penetrating through the main valve element, and
wherein the in-valve small-opening release passage includes a part of the release through-hole and a communication hole, the communication hole extending from the release through-hole to a sliding surface of the main valve element that is adapted to slide on the valve body.

5. The variable-capacity compressor control valve according to claim 4, wherein the in-valve small-opening release passage includes an inner peripheral groove disposed on an upper side of a sliding surface of the valve body on which the main valve element is adapted to slide.

6. The variable-capacity compressor control valve according to claim 1, wherein the in-valve small-opening release passage is adapted to be opened before the valve orifice is closed by the main valve element.

7. The variable-capacity compressor control valve according to claim 1, wherein, when the plunger is continuously moved upward from a lowest position by an attraction force of the electromagnetic actuator, the main valve element is moved upward together with the plunger with the sub valve element closing the in-valve large-opening release passage, thereby opening the in-valve small-opening release passage, and the opening area of the in-valve small-opening release passage is gradually increased as the main valve element is moved upward along with the movement of the plunger, which gradually decreases an area of the main valve opening, and after that, when the valve orifice is closed by the main valve element and the plunger is further moved upward, the sub valve element is moved upward together with the plunger with the main valve element closing the valve orifice, thereby opening the in-valve large-opening release passage.

* * * * *